3,499,830
APPARATUS FOR ELECTROCHEMICALLY
FORMING AND FINISHING GEARS
William Andrew Haggerty and Charles Evans Foertmeyer, Cincinnati, Ohio, assignors to The Cincinnati Milling Machine Co., Cincinnati, Ohio, a corporation of Ohio
Filed Nov. 20, 1967, Ser. No. 684,454
Int. Cl. B23p 1/04; B01k 3/04
U.S. Cl. 204—224                     13 Claims

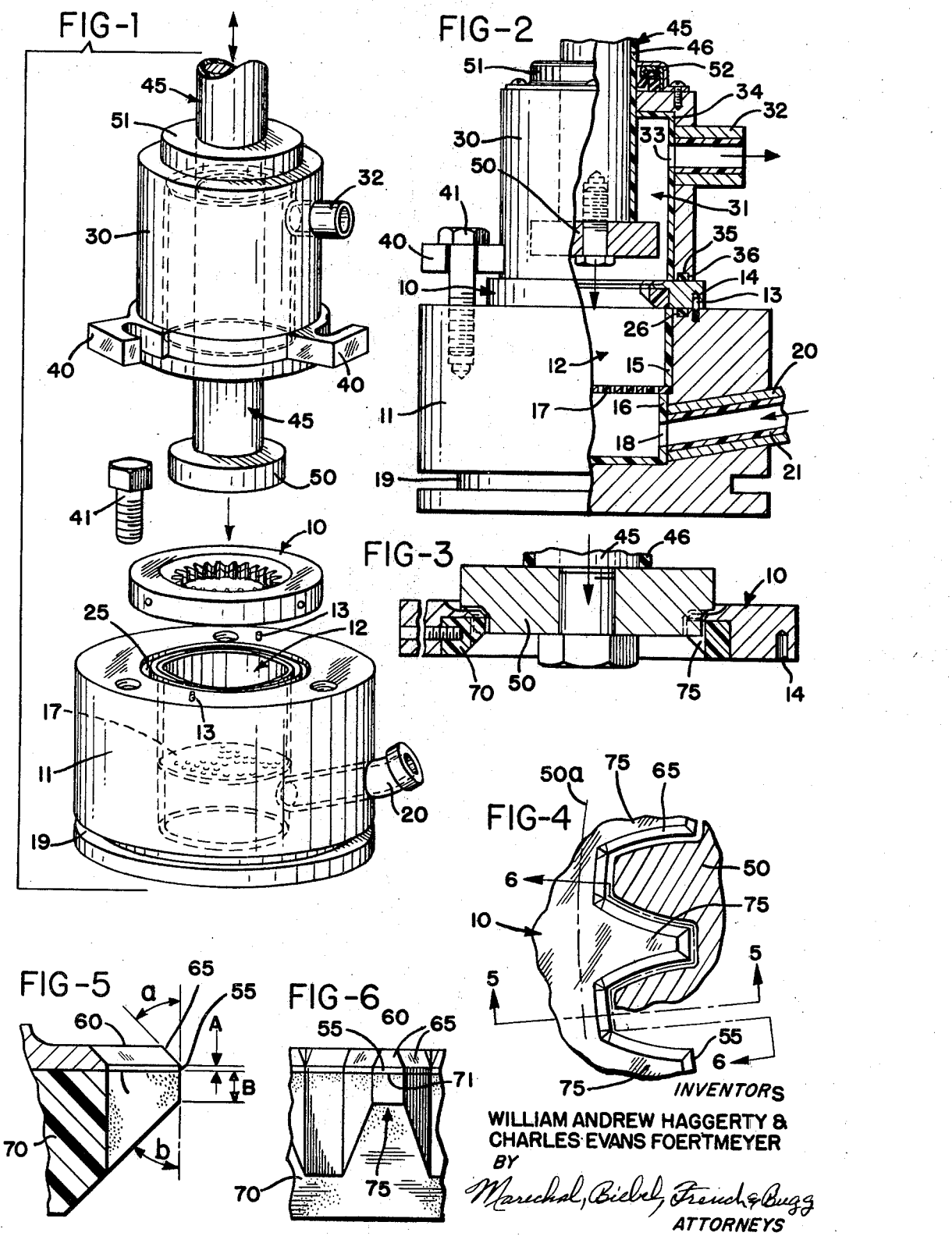

ABSTRACT OF THE DISCLOSURE

An apparatus for electrochemically machining an electrically conducting workpiece into a finished gear in a single machining operation includes a specially designed tool having a plurality of machining surfaces including a finishing machining surface oriented essentially parallel to the direction of relative movement between the tool and the workpiece to determine the final dimension and shape of the workpiece, a frontal machining surface oriented essentially normal to the finishing machining surface to form initial openings in the workpiece which correspond generally to the shape of the finished gear, and a tapered machining surface extending between the finishing machining surface and the frontal machining surface to enlarge the opening thus formed in the workpiece by the frontal machining surface and to limit the machining area of the finishing machining surface and thus limit the amount of overcut between the tool and the workpiece. The apparatus includes means to direct a high volume of electrolyte between the tool and the workpiece and further includes means to place a pressure on the electrolyte after it has passed through the electrochemical machining area.

RELATED APPLICATIONS

Reference is hereby made to United States application Ser. No. 626,901, filed Mar. 29, 1967 for Electrochemical Machining Tool and application Ser. No. 626,732, filed Mar. 29, 1967, for Apparatus for Simultaneously Electrochemically Machining a Plurality of Previously Formed Surfaces of a Workpiece, both applications assigned to the same assignee as the present invention.

BACKGROUND OF THE INVENTION

Electrochemical machining has been used to form articles of various configurations from electrically conductive materials, regardless of the hardness of the material. One of the problems of electrical machining, however, is in machining the finished article to within precisely defined tolerances. This requires that many machining variables, such as voltage, feed rate, electrolyte flow rate and temperature, as well as the electrode or tool configuration be held within close tolerances. Highly accurate finishes can be obtained in some circumstances by preforming the workpiece generally to the shape of the finished article and thereafter utilizing an electrode such as described in the patent applications referred to above. The amount of overcut is held to a minimum with such electrodes and therefore the total effect due to variations in the machining parameters mentioned above are correspondingly minimized.

On the other hand, it is often advantageous to form an article from a solid blank of material without preforming that material. The electrochemical machining tool which performs this function must therefore shape the blank generally to the desired configuration and then finish the article to the precise dimensions and shape in one operation. Heretofore, it has not been possible to make articles having a plurality of rather complicated surface configurations, such as gears, in a single operation since all the surfaces must be machined simultaneously, while at the same time holding these surfaces to very close tolerances.

The difficulty which arises from the standpoint of tool construction is establishing and maintaining an accurate reference dimension which determines the final workpiece dimension. Attempts to provide a tool including only a tapered enlarging surface for machining complex shapes, such as inside and outside gears, within the tolerances acceptable in the industry have proved unsuccessful because of the inability to control the critical radial dimension of that portion of the tool which performs the last machining operation. As a practical matter the difficulty exists in controlling the desired radial dimension of a tapered surface within the precise tolerances required since any variation in the angle of the taper with respect to the axis of the tool, or in the axial location of the taper, for example, will cause errors in the desired radial dimension.

SUMMARY OF THE INVENTION

This invention relates to an electrochemical machining tool which is especially adapted to machine simultaneously a plurality of connected surfaces on a solid electrically conductive workpiece to produce a precisely dimensioned article, such as a gear, in a single machining operation.

The electrochemical machining tool of this invention is provided with three machining surfaces, a frontol machining surface adapted to form openings in the solid electrically conductive workpiece, a tapered machining surface which extends between a finishing machining surface and the frontal machining surface to enlarge the opening thus created between the frontal machining surface and a finishing machining surface which determines the final dimension and shape of the workpiece.

The axial dimension of the finishing machining surface is kept as small as possible to minimize the total amount of overcut between the tool and the workpiece. This machining surface also functions to insure that the final radial dimensions of the tapered machining surface are precisely defined relative to the final radial dimension of the workpiece. Thus, the tool includes a finishing machining surface of closely controlled radial dimensions which is the last of the machining surfaces to do work, and accordingly in combination with the tapered surface accomplishes the final critical dimensioning of the workpiece.

It is therefore an object of this invention to provide an improved electrochemical device and tool for machining from a solid workpiece articles having complicated surface configurations, such as gears, in a single machining operation, the tool having a finishing machining surface defining precisely the dimensions of the tool and the final shape and configuration of the workpiece, a frontal machining surface to form openings initially in the solid workpiece, and tapered machining surface to expand the openings formed by the frontal machining surface and which cooperate with the finishing machining surface to establish the final dimensions of the workpiece.

BRIEF DESCRIPTION OF THE DRAWINGS

FIG. 1 is an exploded pictorial view of an apparatus for electrochemically machining a solid blank of electrically conductive material into a finished gear in a single operation;

FIG. 2 is an elevational view of the apparatus shown in FIG. 1 with a portion of the assembled apparatus shown in section;

FIG. 3 is a cross sectional view of the electrochemical machining tool with the workpiece shown extending partially thereinto;

FIG. 4 is an enlarged fragmentary plan view of the electrochemical machining tool of this invention showing the frontal and tapered machining surfaces and illustrating the separation or overcut between the tool and workpiece;

FIG. 5 is an elevational view of the electrochemical machining tool of this invention taken along line 5—5 in FIG. 4 with the body portion of the tool shown in cross section, and with the dimensions of the tool being indicated generally;

FIG. 6 is a view showing one tooth forming segment of the electrochemical machining tool which is taken along line 6—6 in FIG. 4;

DETAILED DESCRIPTION OF THE INVENTION

Figure 7:
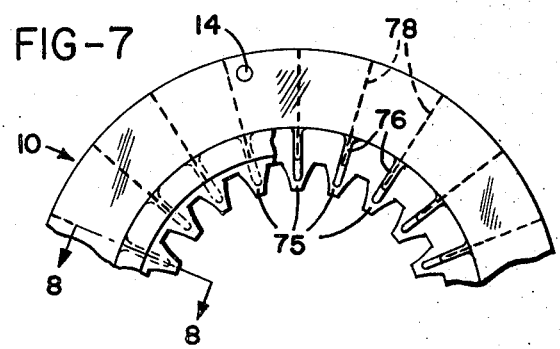
FIG. 7 is a bottom view of a modified electrochemical machining tool incorporating additional material between the inwardly projecting portions of the tool to improve the current carrying capacity of the tool.

Referring now to FIGS. 1 and 2 which show the preferred embodiment of this invention, the electrochemical machining tool 10 is shown mounted on a base member 11 which includes a cavity 12. A pair of alignment pins 13 project upwardly from the upper surface of the base member 11 and are received into corresponding alignment holes 14 (FIGS. 2 and 3) in the electrochemical machining tool 10 to position the tool accurately and to prevent movement of the tool with respect to the base member once the machining operation begins.

The cavity 12 in the base member 11 is slightly larger than the internal opening in the tool 10 but smaller than the outside diameter of the tool. The base member 11 which is made of electrically conductive material such as steel, is protected from corrosion by a plastic liner which also prevents stray electrical currents from causing machining of the workpiece. The plastic liner shown in the preferred embodiment is divided into two sections 15 and 16, with a flow plate 17 separating these two sections. One purpose of the flow plate is to distribute the electrolyte flow so that it passes between the tool and the workpiece evenly and smoothly. The flow plate 17 may also contain a filter to protect the interface between the tool and the workpiece from foreign objects and thus minimize the chance for electrical arcing which would deteriorate the finish of the workpiece.

An opening 18 in the side of the base member 11 permits electrolyte to flow into the lower cavity, through the flow plate and filter 17 into the upper cavity and from there to the gap between the tool and the workpiece. The electrolyte inlet tube 20 communicates with the opening 18 and is also provided with a plastic liner 21 to protect it from any electrochemical machining action. The base member 11 is further provided with a clamping groove 19 which extends completely circumferentially around the base member and which is adapted to hold the assembly on the base of the machine which will move the workpiece relative to the tool 10.

A groove 25 containing an O-ring 26 surrounds the cavity 12 on the upper surface of the base member 11. This O-ring fits in sealing engagement with the lower surface of the electrochemical machining tool 10 to prevent electrolyte from escaping between the tool and the base member 11 once the apparatus is completely assembled.

Positioned above the tool 10 is a low pressure head 30 which includes a cavity 31 having a diameter slightly larger than the maximum diameter of the unfinished workpiece and the maximum diameter of the opening in the tool 10, but which is smaller than the total maximum diameter of the tool. The low pressure head 30 is also provided with a plastic insulation material 31 to prevent any electrochemical machining thereof, although the low pressure head may be constructed of an insulating type material such as plastic since the electrolyte pressure within the head is of a low magnitude. An electrolyte exit pipe 32 extends from an opening 33 in an upper portion of the cavity 31 through the wall of the low pressure head 30.

Included on its lower surface of the head 30 is a groove 35 containing a sealing O-ring 36 which fits into sealing engagement with the upper surface of the electrochemical machining tool 10 to prevent electrolyte from escaping from between those two surfaces when the apparatus is in operation.

The low pressure head 30 has extending therefrom three holddown lugs 40 cooperating with the three bolts 41 which are threaded into the base member 11. As shown in FIG. 1, the lugs 40 are slotted so that the low pressure head can be rotated clockwise placing the lugs 40 under the heads of the bolts 41 and then be locked in place when the bolts are tightened. With the low pressure head 30 in place and secured, the tool 10 is prevented from moving and both O-rings 26 and 36 prevent electrolyte leakage around the tool.

A workpiece holder 45 extends into the cavity 31 of the low pressure head 30 and has the workpiece 50 mounted on the end thereof. The workpiece holder 45 is also provided with an insulating layer 46 to prevent any electrochemical machining of that part during operation. A seal 51, provided between the workpiece 50 and the low pressure head 30, is of conventional construction and it includes a circular rubber gasket 52 having a lip which is held in engagement with the workpiece holder 50 by metal fingers or springs. The rubber gasket 52 is so constructed that as pressure builds up in the chamber 30, the lip is held into tighter engagement with the workpiece holder 50.

Referring now to FIGS. 4, 5 and 6 which shows the electrochemical machining tool of this invention in greater detail, the tool 10 is shown as having three primary machining surfaces. The finishing electrochemical machining surface 55, extending parallel to the direction of relative motion between the tool and the workpiece, defines the inward most extent of the tapered machining surfaces. The axial dimension A of the finishing machining surface 55 is kept as small as possible to avoid increasing the amount of overcut between the tool and the workpiece and yet is substantially constant throughout the extent of the tool so that the overcuts throughout the extent of the tool are of the same magnitude.

The axial dimension A of the first machining surface 55 is in the order of 0.003 to 0.005 inch with this dimension being maintained to an accuracy of ±0.0005 inch. The finishing machining surface shown in the drawings is exaggerated in size for the purpose of clarity in the described invention, however, on an actual tool, the finishing machining surface 55 is practically invisible to the unaided eye.

In the construction of an electrochemical machining tool of this type, it is essential that the dimensions of the tool be held within close tolerances if a precisely dimensioned finished article is to result. Accordingly, the finishing machining surface 55 establishes the final dimensions of the tool and consequently the shape and dimensions of the finished article. The small axial dimension or width of the finishing machining surface 55, since it minimizes the total amount of overcut between the tool and workpiece, also minimizes the total variations in overcuts due to other factors, including but not limited to changes in voltage, electrolyte temperature and flow rate. Therefore, the finishing machining surface, while not absolutely necessary for machining of the workpiece, is necessary for the accurate dimensioning of said workpiece since it defines precisely the inward extent of the tapered machining surface 65.

A frontal electrochemical machining surface 60 is oriented essentially normal to the direction of tool advancement into the workpiece, and functions to form an initial opening in the solid workpiece. The frontal electrochemical machining surface 60 has a configuration which is geometrically similar to that configuration of the finished workpiece although its dimensions and proportions are not necessarily identical thereto.

The second or tapered electrochemical machining surface 65 extends between the frontal machining surface 60 and the finishing machining surface 55. The finishing machining surface, as mentioned above, establishes the final dimensions of the tool and consequently the shape and dimension of the finished article. Therefore, the tool theoretically could be constructed with only a frontal machining surface and a finishing machining surface, however, such a device would not be able to carry the high magnitudes of electrical current necessary for efficient machining. The second machining surface, in addition to enlarging the opening formed by the frontal machining surface, therefore functions to increase the thickness of the tool to give it additional structural strength and to increase its electrical current carrying capacity. In the preferred embodiment of this invention, the angle $a$ which the tapered machining surface 65 makes with the direction of relative movement between the tool and the workpiece is in the order of 45° since this angle provides good flow characteristics for the electrolyte and does not create an excessive amount of over-cut between the tapered surface and the workpiece.

Extending downwardly, as shown in FIG. 5, from the finishing machining surface 55 and flush therewith is an insulating means 70 which assists in the smooth and uninterrupted flow of electrolyte around each of these machining surfaces and between the tool and the workpiece. This insulating means extends from the finishing machining surface to the rear extent of the tool to prevent any electrical current from passing therethrough and thus prevents any further eletrochemical machining of the workpiece. The insulating means, along with the tapered machining surface 65 defines the width A of the finishing machining surface. The insulating means on the inwardly extending portion of the teeth forming means extends from the finishing machining surface 55, for a length B, and then the insulating means tapers to the rear of the tool at the angle $b$. This facilitates the flow of electrolyte over the insulating means and between the machining surfaces of the tool and the workpiece.

In making the tool, the initial tool dimensions are somewhat larger than the final tool dimensions. A flat surface 71 is formed essentially parallel with the frontal machining surface 60 and thereafter, the insulating means 70 is formed by casting the resin so that it is in abutting relationship with the flat surface 71. The finishing machining surface 55 is then ground to its desired dimension with the grinding operation not only removing a portion of the metal which ultimately forms the finishing machining surface, but also removing a portion of the insulating means 70 so that is flush with the finishing machining surface. Thereafter, the tapered machining surface 65 is formed by machining away from the finishing machining surface at the appropriate angle, previously described.

The material used as an insulator 71 possesses essentially the same coefficient of thermal expansion as the material used for the tool. Additionally, the insulating material is non-porous, resistant to absorption of moisture for preventing passage of current through the insulating material to the workpiece, and relatively chemically inert with respect to the electrolyte which flows in the space between the tool and the workpiece. Typical insulating material includes a casting resin type RP–3260 available from Renn Plastics, Inc., of Lansing, Michigan or Stycast casting resin type 2651 MM, available from Emerson and Cuming of Canton, Mass.

In operation, a workpiece 50 having a dimension which is greater than outward dimensions of the tapered machining surface 65, is moved downwardly at a predetermined rate into machining relation with the electrochemical machining tool 10. In FIG. 4, the dotted line 50a identifies the extent of the unmachined workpiece 50. This relationship between the tool and the workpiece may also be seen in FIG. 3.

In the preferred embodiment of this invention, external gears are formed from a blank of steel or other electrically conductive material and are preformed generally to the shape of the gear by the frontal machining surface 60 of the tool 10. The frontal machining surface includes a plurality of inwardly extending portions 71 (FIG. 4) which form the recess portion of the gear in the workpiece 50. Since the frontal machining surface 60 is normal to the direction of travel of the workpiece with respect to the tool, and since a variety of machining areas are presented thus causing different amounts of electrolyte to flow across the various frontal surfaces, the feed rate of the tool into the workpiece is necessarily limited. Furthermore, the feed rate is less than the feed rate possible with tools such as those described in the above mentioned copending applications Ser. No. 626,901 and Ser. No. 626,732, where the preformed workpiece surface is enlarged solely by a tapered electrochemical machining surface. The frontal machining surface 60, however, forms an opening or plurality of openings in the solid workpiece or gear blank 50.

Thereafter, the tapered machining surface 65 enlarges that opening to substantially the finished shape and dimension of the desired workpiece configuration. As previously mentioned, the tapered machining surface is kept as short as possible to insure adequate and smooth electrolyte flow between the tool and the workpiece. The finishing machining surface 55 determines the final shape and dimension of the workpiece.

Figure 8:
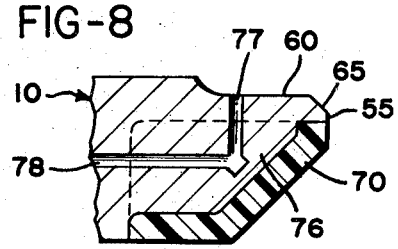
FIG. 8 is a view taken along lines 8—8 in FIG. 7.

FIGS. 7 and 8 show a modification of this invention. FIG. 7 is a bottom view of the electrochemical machining tool with the insulation material shown removed to illustrate the improvement in the tool construction, and FIG. 8 is a cross section of a single inwardly extending rib. Each of the inwardly extending ribs 75 is provided with a web 76 consisting of an extension of the body of the tool. This provides a greater area through which electrical current can flow and therefore insures that the tool remains cooler due to the reduced $I^2R$ drop since the tool resistance is made lower. The webs 76 also improve the mechanical stability of the tool.

Electrolyte is supplied to the chamber 12 in the base member 11 through the electrolyte input pipe 20 under pressure typically in the order of 350 pounds per square inch. This magnitude of pressure insures that an adequate volume of electrolyte flows between the tool and the workpiece and that uniform machining of the workpiece is accomplished. These high flow rates are preferred so that the anodic products of the electrochemical machining reaction are removed and the tool and the workpiece kept at a moderate temperature. Thereby, warpage of the workpiece and the tool is kept to a minimum during machining and therefore a greater degree of dimensional stability may be obtained. Various compositions of electrolyte may be used, however, the electrolyte solution used in the embodiment of the invention described therein was prepared by mixing four pounds of sodium nitrate and three-fourths pound of sodium chloride per gallon of water. During the electrochemical machining operation, the electrolyte temperature has a tendency to increase due to the energy released as the electric current passes from the workpiece to the tool. For this reason, a heat exchanger is provided through which the electrolyte is passed to maintain the electrolyte at a predetermined, usually elevated temperature, in the order of 120° F., prior to the electrolyte being recirculated and resupplied into the space between the workpiece and the tool. The electrolyte is generally preheated prior to the machining operation and then maintained at the predetermined operating temperature throughout the machining operation.

To prevent cavitation of the electrolyte in the area between the tool and the workpiece, a back pressure on the electrolyte exit pipe 32 may be provided, and in the preferred embodiment of the invention, this back pressure is in the order of 50 pounds per square inch. Due to the small magnitude of this back pressure, the low pressure head 30 may be constructed of lighter weight materials than the base member 11. Accordingly, it is contemplated that a plastic or fiber material could be used as well as steel or other metal for the low pressure head 30.

A further modification of the invention, also shown in FIGS. 7 and 8, includes a plurality of openings in the frontal machining surface of the tool, each of which communicates with the exterior of the tool to provide a path for the electrolyte to flow in that portion of the frontal machining surface having the greatest machining area. Consequently, higher feed rates are possible since the flow characteristics of the electrolyte are improved and cavitation is reduced. In FIG. 8, these openings are formed by drilling a plurality of small holes 77 perpendicularly to the frontal machining surface, one hole in each of the radially extending teeth forming means. A corresponding plurality of holes 78, each extending radially through the body of the tool to its outer circumference extent, join the holes 77 in the interior of the tool. With some tool designs, the holes may be formed to extend diagonally from the frontal machining surfaces to the exterior of the body of the tool.

When such a tool is employed with the apparatus shown in FIG. 1, a portion of the electrolyte will flow out through holes 78 and would not flow into the chamber 31. It has been found, however, that the volume of the electrolyte which passes through these holes is not great enough to reduce significantly the ability of a restriction in the pipe 32 to provide back pressure. Indeed, utilizing such holes provides the further advantage of reducing the requirement for back pressure since the electrolyte will be able to move more readily over the machining surfaces at a high and uniform velocity.

In the preferred embodiment a low potential difference exists between the tool and the workpiece, e.g. 8–15 volts, and accordingly, a feed rate of approximately 0.150 inch per minute is employed. This provides overcuts in the order of 0.006 inch and microfinishes of the surfaces of the finished article or gear in the order of 20 microinch, arithmetic average.

Another embodiment of this invention is shown in FIGS. 9 through 12, the same reference numerals being used on parts having similar functions as those shown in FIGS. 1 and 2. This embodiment is adapted to machine helical gears electrochemically from a solid workpiece blank in a single operation by rotating the workpiece as it is advanced into the tool.

Figure 9:
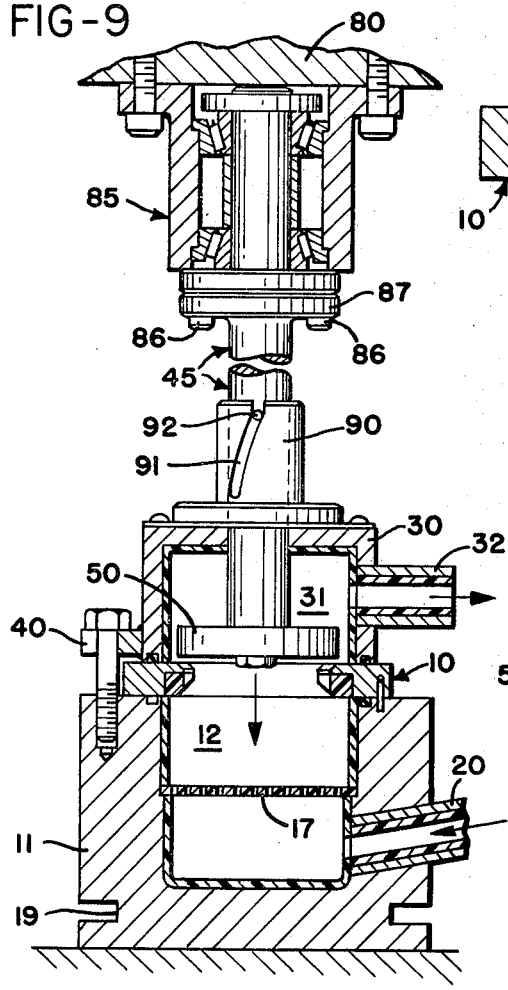
FIG. 9 is a view partly in section and partly in elevation, showing a modification of the electrochemical machining apparatus of FIGS. 1 and 2 wherein the workpiece is rotated as it is advanced into the tool to form a helical gear.

Referring specifically to FIG. 9, the workpiece holder 45 is rotatably mounted to the mechanism 80 which advances the workpiece 50 at a substantially constant rate into and through the electrochemical machining tool 10. The workpiece holder 45 is mounted on a bearing assembly, shown generally at 85, by means of screws 86 through the flange 87. The details of the bearing assembly 85 form no part of the present invention but the bearing assembly 85 is so constructed that the workpiece holder 45 rotates only about its own axis and no axial or lateral movement of the workpiece holder 45 relative to the mechanism 80 is permitted during the machining operation.

A sleeve 90, fixed to the low pressure head 30, surrounds the workpiece holder 45 and has a helical slot 91 cut therein to receive the pin 92 which extends outwardly from the workpiece holder 45. Thus, as the workpiece holder 45 moves downwardly, the pin 92 coacts with the slot 91 to rotate the workpiece holder, and thus the workpiece 50, relative to the tool 10.

Figure 10:
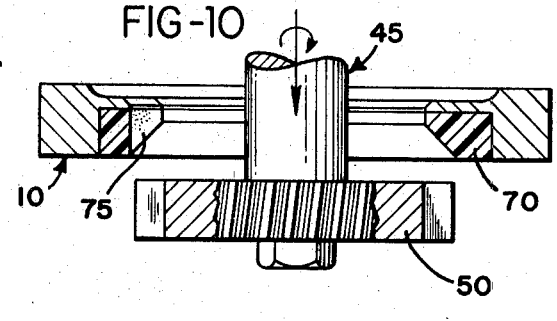
FIG. 10 is an enlarged cross sectional view of the electrochemical machining tool for forming helical gears and shows a completed workpiece, partly in cross section, after it has been formed by the tool.

The tool 10, shown in cross section in FIG. 10, has an appearance similar to the tool shown in FIG. 3, but the finished gear is shown as having helical teeth, the angle of which is determined by the angle of the slot 91 in the sleeve 90. The machining surfaces of the tool 10 are identical to those described above, however, in order to accommodate the machined teeth on the workpiece as it is rotated relative to the tool, the insulating means 70 is tapered away from the direction of rotation at an angle $t$ slightly greater than the helix angle of the gears formed to permit electrolyte to flow between the workpiece and the tool and over each of the machining surfaces.

Figure 11:
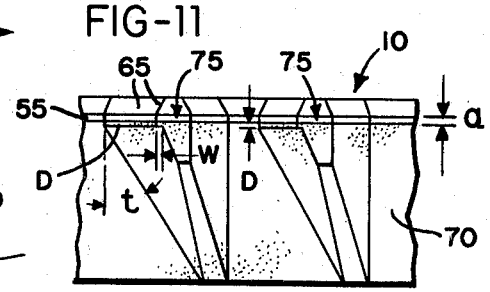
FIG. 11 is a view showing two teeth forming segments of the electrochemical machining tool with the insulation tapering away in the direction of relative movement of the tool to provide clearance between the workpiece and the tool and to provide a path of flow for the electrolyte.

As shown in FIG. 11, the insulating means 70 is tapered only on that side of the inwardly extending teeth forming portion of the tool which would otherwise intercept the workpiece as it is rotated. The tapering of the insulating surface does not start immediately adjacent the finishing machining surface 55, however, since the insulating means 70 functions to define the axial dimension of the finishing machining surface 55. Accordingly, a small axial length D of insulation extends from the finishing machining surface 55 before the insulating means 70 is relieved to accommodate the workpiece. The insulation is then cut away to a depth W and then tapered at the angle $t$ which is slightly greater than the helix angle.

Figure 12:
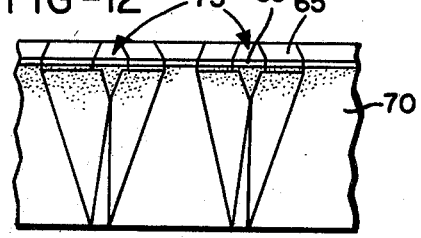
FIG. 12 is a view showing two teeth forming elements of the electrochemical machining tool of FIG. 10 with both sides of the insulation being tapered so that either right handed or left handed helical gears may be formed.

FIG. 12 is a view showing two teeth forming elements of an electrochemical machining tool similar to that of FIG. 11 except that both sides of the insulating means on the inwardly extending portion of the tooth forming means of the tool 10 are tapered so that either right hand or left hand helical gears may be formed by the same tool. Again, the machining surfaces are identical to those previously described, however, the angle at which the insulating means tapers is necessarily restricted since some insulation must remain at the rearmost extent of the tool. Accordingly, if large helix angles are desired, the embodiment shown in FIG. 11 is preferred.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for electrochemically forming finished gears from a solid workpiece of predetermined thickness in a single, continuous operation wherein electrolyte is passed between the workpiece and a tool and wherein a potential difference exists between the workpiece and the tool such that the workpiece is anodic with respect to the tool including, a tool having a plurality of radially extending teeth-forming means including, a finishing electrochemical machining surface oriented essentially parallel to the longitudinal direction of relative movement between said tool and the workpiece and having a dimension and configuration determining the final dimension and shape of the finished workpiece;

a frontal electrochemical machining surface oriented essentially normal to said finishing surface to form initial openings in the workpiece corresponding generally to the shape of the teeth being formed; and a tapered electrochemical machining surface extending between said finishing surface and said frontal surface;

said tool being advanceable into a workpiece at a substantially constant rate with said frontal electrochemical machining surface forming openings in the workpiece which correspond generally to the shape of the desired finished gear, and with said tapered electrochemical machining surface enlarging the openings thus formed to the final dimension and shape of the gear as determined by the finishing electrochemical machining surface.

2. The apparatus of claim 1 wherein the tool further includes, insulating means abutting and flush with said finishing electrochemical machining surface to define, along with the tapered surface, the width of said finishing electrochemical machining surface, said insulating means extending therefrom to the rearmost extent of said tool to provide for the smooth and uninterruped flow of electrolyte over each machining surface and to prevent further electrochemical machining of the workpiece by preventing electrical current from passing therethrough in those areas where said insulating means is present.

3. An apparatus as set forth in claim 1 wherein said finishing machining surface has a width from 0.003 inch to 0.005 inch.

4. An apparatus as set forth in claim 1 in which a back pressure is maintained on the electrolyte between said tool and the workpiece to assure flow of electrolyte between all opposing working portions of the tool and workpiece.

5. An apparatus as set forth in claim 1 in which said tool includes teeth forming elements on the outside periphery thereof.

6. An apparatus as set forth in claim 1 in which said tool includes teeth forming elements on the inner periphery thereof.

7. An apparatus as set forth in claim 6 in which the final dimension of said teeth is controlled by said finishing surface with said finishing surface having an axial dimension from 0.003 inch to 0.005 inch.

8. The apparatus of claim 1 wherein helical gears are formed from a solid workpiece by causing relative rotational movement between the workpiece and the tool as the workpiece is advanced into the tool, said apparatus further including:

means rotatably mounted to hold the workpiece for advancement into said tool; and means to rotate said workpiece holder and thus the workpiece as the workpiece is advanced into the tool.

9. An apparatus as set forth in claim 8 wherein said tool is rotated clockwise.

10. The apparatus of claim 8 further including insulating means abutting and flush with said finishing electrochemical machining surface to define, along with said tapered surface, the width of said finishing electrochemical machining surface;

said insulating means extending from said finishing electrochemical machining surface at an angle greater than the helix angle to the rearmost extent of the tool to permit relative rotational movement between said tool and the workpiece while maintaining the spacing therebetween to provide for the smooth and uninterrupted flow of electrolyte between said tool and the workpiece and over each of said machining surfaces.

11. The apparatus as set forth in claim 1 further including a body member integral with said radially extending teeth forming means; and a web, also integral with said body member and said teeth forming means, and extending generally rearwardly from each of said frontal machining surfaces and radially to said body member to provide an enlarged area through which electrical current flows therefore to reduce the electrical resistance of said tool.

12. The apparatus as set forth in claim 1 further including a body member integral with said teeth forming means;

openings in said frontal machining surface in each of said radially extending teeth forming means; and corresponding openings extending generally radially through said body member communicating with said openings in said frontal machining surface to provide an additional path for electrolyte flow to improve the flow characteristics of the electrolyte between said tool and the workpiece and to reduce the effects of cavitation.

13. The apparatus as set forth in claim 1 further including:

a body member integral with said teeth forming means;

a plurality of openings in said frontal machining surface each communicating with the exterior of the tool to provide an additional path for electrolyte flow to improve the flow characteristics of the electrolyte between the tool and the workpiece.

References Cited

UNITED STATES PATENTS

| | | | |
|---|---|---|---|
| 2,650,979 | 9/1953 | Teubner | 204—143 XR |
| 3,288,699 | 11/1966 | Trager et al. | 204—224 |
| 3,410,781 | 11/1968 | Carlson et al. | 204—224 |
| 3,429,798 | 2/1969 | Beck et al. | 204—224 XR |

JOHN H. MACK, Primary Examiner

D. R. VALENTINE, Assistant Examiner

U.S. Cl. X.R.

204—212, 225